UNITED STATES PATENT OFFICE.

JOHN ADDINGTON CAVERHILL, OF TILLSONBURG, ONTARIO, CANADA.

METHOD OF PREPARING BARLEY.

No. 878,189.      Specification of Letters Patent.      Patented Feb. 4, 1908.

Application filed April 12, 1906. Serial No. 311,282.

*To all whom it may concern:*

Be it known that I, JOHN ADDINGTON CAVERHILL, a subject of the King of Great Britain, residing at Tillsonburg, in the county of Oxford, Province of Ontario, in the Dominion of Canada, have invented certain new and useful Improvements in Methods of Preparing Barley in the Manufacture of Food Products, of which the following is a specification.

My invention consists in partially predigesting the cereal by artificial germination so as to transpose a portion of the starch contained in the grain to a substance readily assimilated by the digestive organs.

The barley to be treated is first soaked or steeped in warm water raised to a temperature of sixty-five to seventy-five degrees Fahrenheit (which will not kill but will begin and foster the process of germination) until such time as the grain is softened and the process of germination is started, the length of time being about ten to twelve hours but varying according to the kind and hardness of the grain to be treated.

The barley when thus softened is then removed to a chamber or compartment and placed upon perforated pans, screens or other receptacles which will allow a free circulation of air through the said grain and drainage of all surplus water, and remains there for a period of from thirty-six to forty-eight hours which time will vary according to the kind or hardness of the grain used. Such chamber or compartment to be kept at a temperature of from ninety-five to one hundred and five degrees Fahrenheit so that the germinating process will be continued. The grain while in said chamber or compartment is kept moist by means of sprays of warm water, steam or vapor. During this process the grain is stirred, turned or agitated by mechanical means so as to secure a uniform germination by allowing the free circulation of air and an equal exposure to moisture of all portions of the grain. At this point the process of germination is stopped before the blade emerges from the kernel and before the conversion of the starch has been carried to such an extent as to disintegrate the grain. The grain is then placed upon drying pans or kilns or other receptacles to which heat is applied at a temperature of about one hundred to one hundred and twenty-five degrees Fahrenheit and the moisture driven off as rapidly as possible until the grain is thoroughly dried and the process of germination entirely stopped and the grain left hard and dry for purpose of milling.

After the grain has been thoroughly dried as above set forth it is passed through a scouring machine or other suitable machinery for the purposes of removing the husks or hulls, and the kernels are then submitted to steam under high pressure so as to thoroughly soften and partially cook the grain and then passed over superheated rolls or ground or otherwise manufactured into whatever form is desired for human consumption and it is then ready for food. The result of this process is that a chemical change takes place in the grain by the natural process of germination which converts the starch or a considerable portion of it into a substance easy of digestion and of ready assimilation by the digestive organs, and practically predigests the grain before it is ground. This process has never been used before for this purpose. Other means of predigesting have been entirely by the application of external means such as application of heat, instead of internally by the natural process of germination, artificially started and artificially stopped as above set forth. The advantage is that a food is produced fit for human consumption and so nearly digested and easy of assimilation, that it has under practical tests been proved to be capable of ready digestion by people with weak stomachs, by persons troubled with indigestion, by invalids and even by children under one year of age.

The result of the rapid germination practiced in this method, which resembles the conditions surrounding natural germination in the torrid zone as distinguished from the ordinary malting process which is accomplished under conditions resembling natural germination in the temperate zone, is that the plumule or acrospire of the barley is developed more rapidly than in the ordinary malting process while the rootlets are not developed as much and as the development of the plumule or acrospire produces the greater amount of diastase, this rapid germination produces a greater amount of diastase than in the malting system and makes the grain more digestible as the diastase assists very much in converting the starch into sugar and so assists in predigesting and produces a much more digestible substance and one peculiarly well adapted to the requirements of infants, children, invalids and persons with weak digestions, while at the same time remaining very palatable and appetizing. The rapidity of the process also prevents the development of rootlets as in the malting process and this results in less shrinkage in the grain and lessens the loss in the process.

The offal from the grain which has been so treated can be used for food for stock as the process of germination has rendered the hulls and the part of the grain which necessarily adheres to the same more digestible and therefore more beneficial for stock.

Having thus described my invention what I claim is—

1. In the method of preparing barley in the manufacture of food products, soaking the grain in water for ten to twelve hours having a temperature of substantially seventy-five degrees (Fahrenheit), removing the grain to a receptacle having a temperature of about ninety to one hundred and five degrees (Fahrenheit) and subjecting the grain to said temperature during substantially twenty-five hours, spraying the grain in the meantime with steam or warm water and agitating it so as to insure a free circulation of air therethrough, then removing the grain before the blade emerges therefrom to a receptacle having a temperature of over one hundred degrees (Fahrenheit) to rapidly dry it, and then removing the husks from the grains, substantially as described.

2. The method of preparing barley comprising soaking the grains in water of the temperature of substantially seventy-five degrees (Fahrenheit) for ten hours, removing the grains to a receptacle and subjecting them to a temperature of about ninety to one hundred and five degrees (Fahrenheit) for a period of twenty-five to forty hours while being sprayed with steam or warm water and agitated so as to insure a free circulation of air therethrough, then removing the grains before the blades emerge therefrom to a receptacle having a temperature of over one hundred degrees (Fahrenheit) to dry the grain rapidly and prevent further germination, then removing the husks from the grains, then submitting the kernels to the action of steam to soften and partially cook them, and finally rolling the grains into flakes, substantially as described.

In testimony whereof I hereto affix my signature in the presence of two witnesses.

JOHN ADDINGTON CAVERHILL.

Witnesses:
MARY HORNE,
A. H. DOWLER.